Sept. 8, 1959        Y. CONAN        2,902,880
UNITS COMPRISING A GASEOUS FLUID TURBINE AND A SPEED REDUCER
Filed Nov. 15, 1956        3 Sheets-Sheet 3
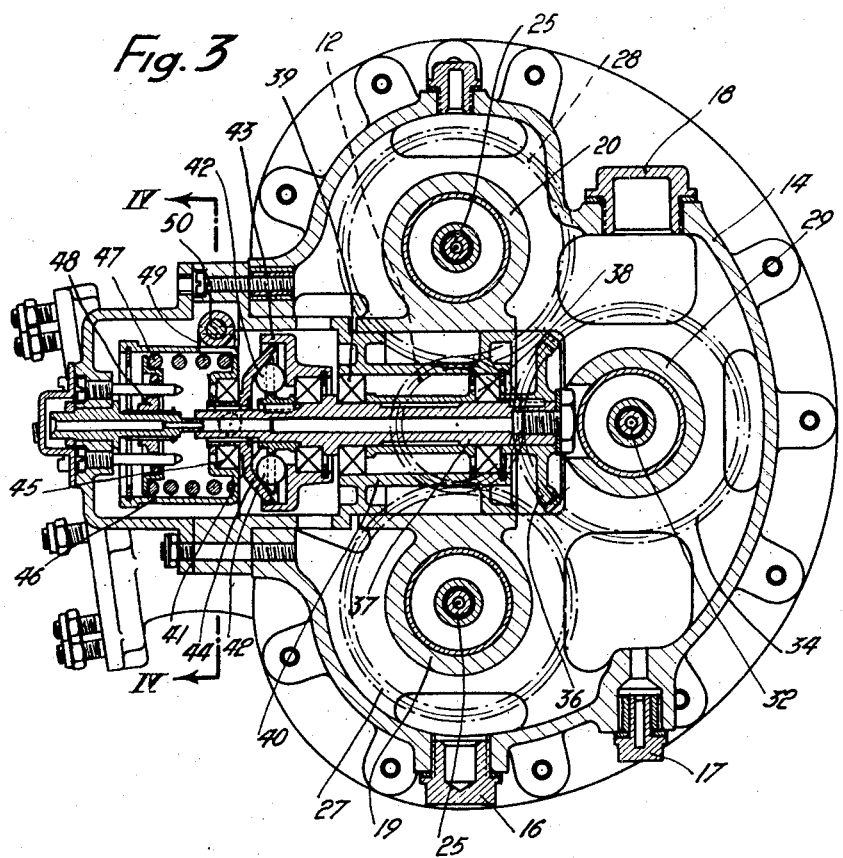
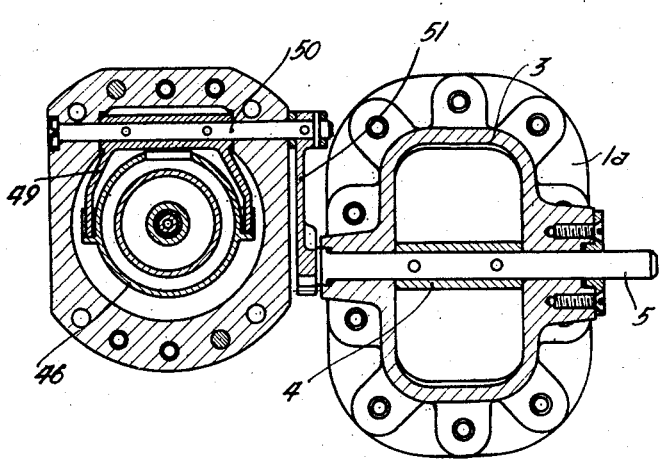
Inventor:
Yves Conan
By
Leonard S. Knox

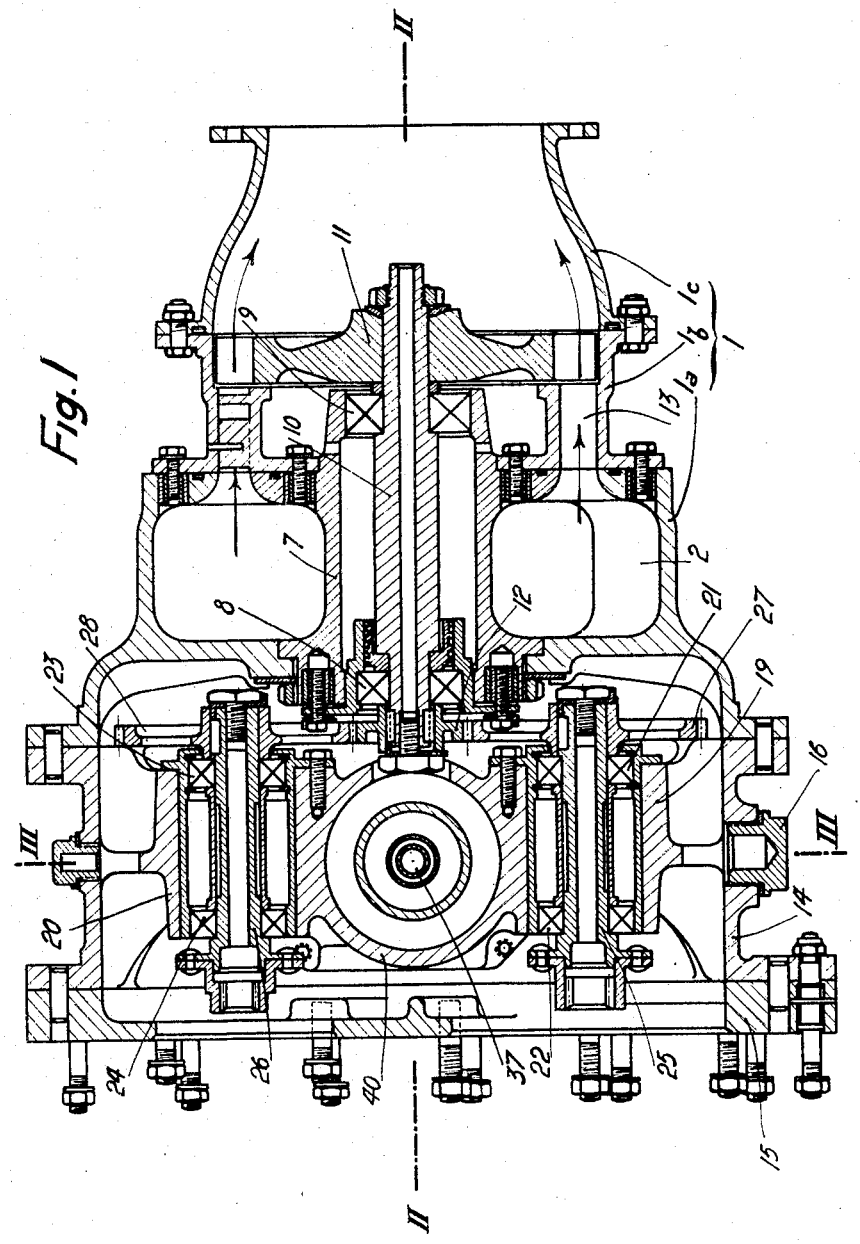

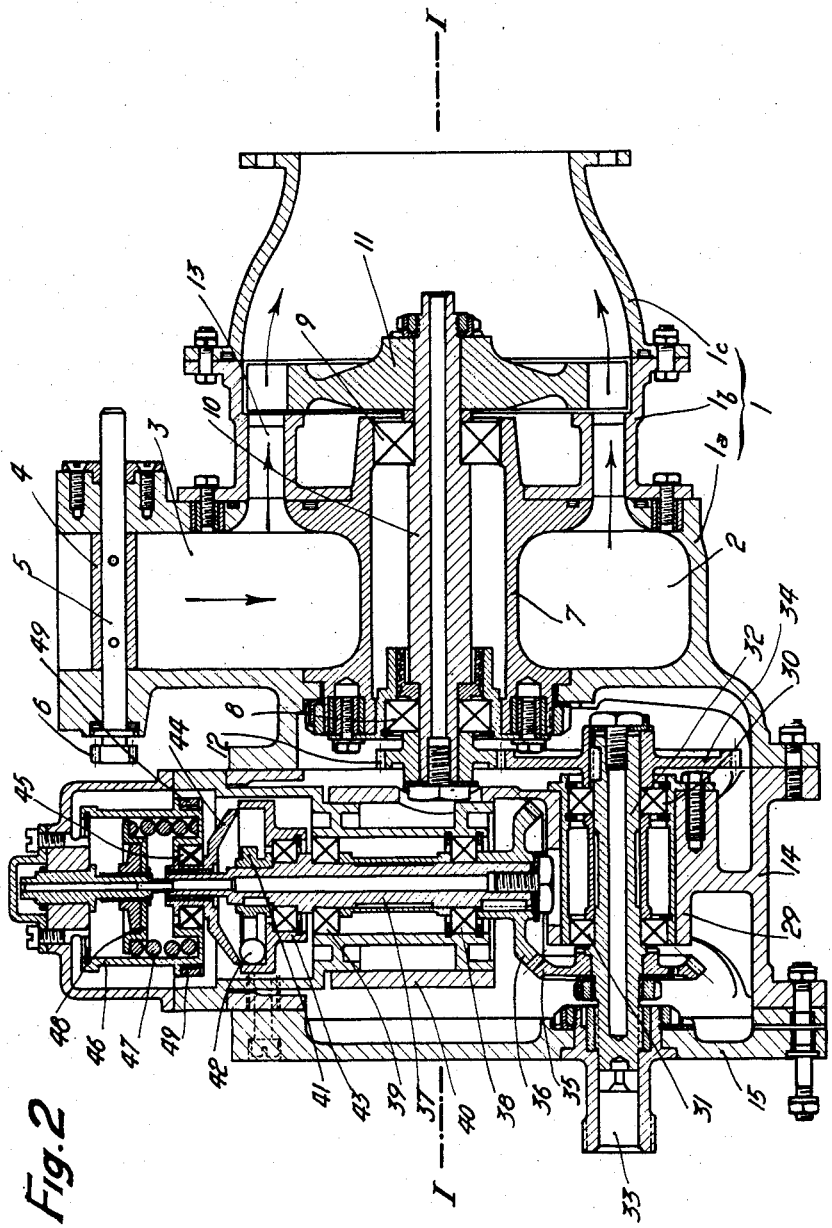

United States Patent Office 2,902,880
Patented Sept. 8, 1959

2,902,880

UNITS COMPRISING A GASEOUS FLUID TURBINE AND A SPEED REDUCER

Yves Conan, Enghien, France, assignor to Bronzavia S.A., Courbevoie, France, a French company Application November 15, 1956, Serial No. 622,453

Claims priority, application France November 30, 1955

7 Claims. (Cl. 74—472)

The present invention relates to gaseous fluid turbines and in particular to units comprising a turbine and speed reducer and its object is to provide improvements in this type of apparatus, these improvements being characterized by the following features and combinations thereof.

The speed reducer of the unit comprises at least two main driven shafts which are intended for the driving of apparatus and are parallel to the axis of the shaft of the turbine wheel.

When the unit comprises two main driven shafts, the latter are disposed in a plane containing the extension of the axis of the turbine shaft.

The speed governor and the tachometer connection are driven from an auxiliary driven shaft parallel to the main driven shafts and disposed in a plane which contains the extension of the axis of the turbine shaft and is perpendicular to the plane containing said main driven shafts.

The shaft of the speed governor, driven by the auxiliary driven shaft, is perpendicular to the latter and housed in the space between the main driven shafts.

All the driven shafts are driven by the turbine shaft through speed-reducing spur gears.

The shaft of the speed governor is driven by the auxiliary driven shaft through bevel gears having a ratio of 1:1.

The governor, which is of the direct action type, comprises balls which are driven by the governor shaft and cooperate, firstly, with a fixed plate or cup and, secondly, with a slidable plate whose axial movements are transmitted to a cage subjected to the opposing action of a spring which tends to apply the slidable plate against the balls.

The butterfly throttle regulating the flow of the gaseous fluid supplied to the turbine is actuated by the governor through gearing comprising a toothed sector and gear pinion controlled by a pivotable fork which is controlled by the movements of the spring loaded cage of the governor.

The turbine unit embodying the invention is of particular use in the driving of apparatus such as a generator, fuel pump, etc. on so-called "special" engines, the motive fluid being compressed air from a dynamic air supply.

It will be understood that this unit may have other applications and the motive fluid may be, for example, air from a compressor such as the compressor of a turbo-jet engine.

In the case of application of the unit to a special engine or machine, before starting up, the generator is connected to an external source of current so as to operate as a motor and drive the fuel pump and the turbine.

When the engine starts up, the source of current is suddenly switched off but the unit comprising the generator, pump and turbine continues to rotate for several seconds under the effect of the force of inertia. At the end of this lapse of time the engine reaches such speed that the dynamic pressure of the air drives the turbine, automatic switching means ensuring that the governor ceases to operate as a motor and starts to operate as a generator.

Further features and advantages of the invention will be apparent from the ensuing description of one embodiment of the invention with reference to the accompanying drawings, to which the invention is in no way limited.

In the drawings:

Fig. 1 is a longitudinal sectional view taken along line I—I of Fig. 2 of the unit;

Fig. 2 is a longitudinal sectional view taken along line II—II of Fig. 1;

Fig. 3 is a cross-sectional view taken along line III—III of Fig. 1, and

Fig. 4 is a sectional view, taken along line IV—IV of Fig. 3, of the butterfly throttle and its associated control means.

The turbine and speed reducer unit shown in the drawings comprises a turbine stator 1 consisting of casing members 1a, 1b, 1c which are interconnected in joint planes perpendicular to the longitudinal axis of the unit. The member 1a comprises an inlet chamber 2 for the motive fluid, which enters through a passageway 3 whose cross-sectional area is regulated by a butterfly valve 4 fixed of a shaft 5, a pinion gear 6 being fixed on the latter, outside the passageway 3. Also mounted inside the casing member 1a is a bearing block 7 supporting two anti-friction bearings 8 and 9 for a shaft 10 of which one end carries a turbine wheel 11 and the other a driving gear 12. The casing member 1b, in which the turbine wheel 11 rotates, carries a guide vane ring 13. The casing member 1c forms an outwardly convergent chamber through which the expanded motive fluid flows out of the unit.

The member 1a is fixed to a housing 14 of a speed reducer, the joint plane between the member 1a and the housing being perpendicular to the longitudinal axis of the unit. The housing 14 is closed by a cover 15 on which may be mounted the apparatus to be driven by the turbine, such as, for example, a generator, a fuel pump, etc.

The housing 14 is provided with a drain plug 16, a fluid-level plug 17, and an oil filling plug 18.

Disposed in the housing 14 are bearing blocks 19 and 20 for anti-friction bearings 21, 22 and 23, 24 for driven shafts 25 and 26 respectively. The latter are situated in a diametral plane containing the turbine shaft 10.

One end of each of the driven shafts 25 and 26 is provided with a power take-off or connection for the apparatus to be driven. The other end of shaft 25 carries a gear 27 and the other end of the shaft 26 carries a gear 28, these gears 27 and 28 being engaged with the gear 12.

Also disposed in the housing 14 is a bearing block 29 for anti-friction bearings 30 and 31 of a third driven shaft 32 which carries the tachometer connector 33. Fixed to the shaft 32 is a gear 34, engaged with the gear 12, and a bevel gear 35 for connecting the shaft 32 to the governor controlling the butterfly valve 4.

Geared with the bevel gear 35 is another bevel gear 36 fixed to the shaft 37 of the governor, this shaft being supported by anti-friction bearings 38 and 39 supported by a bearing block 40 mounted in the housing 14.

Fixed to the shaft 37 is a driver or impeller 41 adapted to drive in rotation balls 42 which roll in a fixed cup or plate 43 and co-operates with a slidable conical plate 44.

The slidable plate 44 is supported, through the medium of an anti-friction bearing 45, by a slidable cage 46 subjected to the action of a spring 47 which bears against an abutment 48, the arrangement being such that the spring 47 tends to move the plate 44 axially in a direction opposite to that in which the balls 42 tend to move this plate under the effect of centrifugal force.

Engaged with the cage 46 are the branches of a fork 49 fixed on a shaft 50 to which is fixed a toothed sector 51 engaged with the gear 6 connected to the butterfly 4.

Although a specific embodiment of the invention has been described, many modifications and changes may be made therein without departing from the scope of the invention as defined in the appended claims.

What I claim is:

1. A motor unit for driving apparatus, having a gaseous fluid turbine and comprising: a casing; a driving shaft rotatable in said casing; a turbine wheel fixed on the driving shaft; at least one main driven shaft parallel to the axis of the driving shaft for driving said apparatus; transmission means for operatively connecting the driving shaft to the main driven shaft; a speed governor; means controlled by the latter for regulating the supply of gaseous fluid to the turbine; an auxiliary driven shaft with an auxiliary power output connection; other transmission means for operatively connecting the auxiliary driven shaft to the driving shaft; and further transmission means for operatively conecting the auxiliary driven shaft to the speed governor.

2. A motor unit as claimed in claim 1, wherein the auxiliary driven shaft is parallel to the main driven shaft and is disposed in a plane containing the axis of the driving shaft and which is substantially perpendicular to the plane containing both the main driven shaft and the axis of the driving shaft.

3. A motor unit as claimed in claim 1, wherein the speed governor includes a control shaft which is perpendicular to the auxiliary driven shaft.

4. A motor unit as claimed in claim 1, wherein the transmission means connecting the driven shaft to the driving shaft of the turbine are speed-reducing spur gears.

5. A motor unit as claimed in claim 3, wherein the transmission means connecting the control shaft of the speed governor to the auxiliary driven shaft comprise bevel gears having a ratio of 1:1.

6. A motor unit as claimed in claim 3, wherein the speed governor comprises: a driving member fixed to said control shaft; balls capable of being rotated about said control shaft by the driving member; a fixed plate encompassing said control shaft and against which the balls are capable of bearing; a rotatable cup co-operable with the balls and capable of sliding along said control shaft; a cage slidable together with the rotatable cup; resiliently yieldable means for urging the cage against the cup and the cup against the balls, and connecting means for operatively connecting the cage to said means for regulating the supply of gaseous fluid to the turbine.

7. A motor unit as claimed in claim 6, wherein the connecting means between the cage and said regulating means regulating the supply of gaseous fluid to the turbine comprise a gear connected to said regulating means, a rotatable shaft, a fork fixed on the latter and engaged with the slidable cage for rotating said shaft according to the movements of the cage, and a toothed sector engaged with the gear and fixed on the rotatable shaft.

References Cited in the file of this patent

UNITED STATES PATENTS

| | | |
|---|---|---|
| 1,028,042 | Luckenbach | May 28, 1912 |
| 1,372,756 | Lambert | Mar. 29, 1921 |
| 2,759,327 | Huber | Aug. 21, 1956 |